US011979730B2

(12) United States Patent
Xu et al.

(10) Patent No.: US 11,979,730 B2
(45) Date of Patent: May 7, 2024

(54) LOUDSPEAKER ASSEMBLY AND ELECTRONIC DEVICE

(71) Applicant: Gree Electric Appliances, Inc. of Zhuhai, Guangdong (CN)

(72) Inventors: Chao Xu, Guangdong (CN); Ruimin Li, Guangdong (CN); Ke Feng, Guangdong (CN); Ming Xie, Guangdong (CN); Shicai Long, Guangdong (CN); Qilu Ye, Guangdong (CN); Zhekang Luo, Guangdong (CN); Yadong Zheng, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 579 days.

(21) Appl. No.: 17/053,581

(22) PCT Filed: Aug. 6, 2019

(86) PCT No.: PCT/CN2019/099437

§ 371 (c)(1),
(2) Date: Nov. 6, 2020

(87) PCT Pub. No.: WO2020/038227

PCT Pub. Date: Feb. 27, 2020

(65) Prior Publication Data

US 2021/0235197 A1 Jul. 29, 2021

(30) Foreign Application Priority Data

Aug. 22, 2018 (CN) ......................... 201810963324.3

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/025* (2013.01); *H04R 1/1041* (2013.01); *H04R 9/02* (2013.01);
(Continued)

(58) Field of Classification Search
CPC .... H04R 1/025; H04R 1/1041; H04R 1/2842; H04R 9/02; H04R 9/06; H04R 2400/03;
(Continued)

(56) References Cited

U.S. PATENT DOCUMENTS 8,311,258 B2 * 11/2012 Lin ...................... H04R 1/1041 381/345
2014/0226847 A1 * 8/2014 Yang .................... H04R 1/1075 381/380
2018/0199129 A1 * 7/2018 Zhao .................... H04R 1/2849

FOREIGN PATENT DOCUMENTS

CN 202218384 U 5/2012
CN 103297568 A 9/2013
(Continued)

OTHER PUBLICATIONS

International Search Report issued in connection with PCT Application No. PCT/CN2019/099437 dated Oct. 30, 2019.
(Continued)

*Primary Examiner* — Huyen D Le
(74) *Attorney, Agent, or Firm* — Dennemeyer & Associates LLC; Victoria Friedman

(57) ABSTRACT

The present disclosure provides a loudspeaker assembly and an electronic device, relating to the technical field of electronic devices, so as to solve the problems of single sound effect and lack of good sound effect. The loudspeaker assembly includes a first housing, a second housing, a loudspeaker vibrator and an adjusting mechanism. The first housing and the loudspeaker vibrator form a first cavity, and
(Continued)

the second housing and the loudspeaker vibrator form a second cavity. The adjusting mechanism includes a driving mechanism and a filling part. The driving mechanism drives the filling part to move, so as to change the volume of the filling part extending into the second cavity.

10 Claims, 2 Drawing Sheets

(51) Int. Cl.
*H04R 1/10* (2006.01)
*H04R 9/02* (2006.01)

(52) U.S. Cl.
CPC ...... *H04R 2400/03* (2013.01); *H04R 2400/11* (2013.01); *H04R 2499/11* (2013.01); *H04R 2499/15* (2013.01)

(58) Field of Classification Search
CPC ............ H04R 2400/11; H04R 2499/11; H04R 2499/15
See application file for complete search history.

(56) References Cited

FOREIGN PATENT DOCUMENTS

| | | | |
|---|---|---|---|
| CN | 103596102 | A | 2/2014 |
| CN | 104066031 | A | 9/2014 |
| CN | 104080023 | A | 10/2014 |
| CN | 106686503 | A | 5/2017 |
| CN | 206533493 | U | 9/2017 |
| CN | 108924712 | A | 11/2018 |
| CN | 208657073 | U | 3/2019 |
| WO | 2017012530 | A1 | 1/2017 |

OTHER PUBLICATIONS

Search report for Chinese application CN201810963324A filed on Aug. 22, 2018.

* cited by examiner

LOUDSPEAKER ASSEMBLY AND ELECTRONIC DEVICE

CROSS-REFERENCE TO RELATED APPLICATION

This is a 35 U.S.C. 371 National Stage patent application of International Application No. PCT/CN2019/099437, filed Aug. 6, 2019, which claims priority to Chinese application 201810963324.3, filed May 6, 2015, each of which is hereby incorporated by reference in its entirety.

TECHNICAL FIELD

The present disclosure relates to a technical field of electronic devices, in particular to a loudspeaker assembly and an electronic device.

BACKGROUND

A loudspeaker assembly is an important part of electronic devices. For example, in electronic devices such as a smart phone and a tablet computer, the loudspeaker assembly makes sound and transmits it to a user. The loudspeaker assembly generally includes a loudspeaker vibrator, a front cavity and a rear cavity. The working performance of the loudspeaker assembly mainly depends on the volume size of the front cavity and the rear cavity, and the volume size of the rear cavity mainly determines the audio performance.

At present, the loudspeaker assembly in a smart phone generally includes a front housing, a rear housing and a loudspeaker vibrator. The loudspeaker vibrator and the front housing form the front cavity, and the loudspeaker vibrator and the rear housing form the rear cavity. The volume of the formed front cavity and rear cavity is fixed and cannot be adjusted, so the sound effect is single. In addition, when the loudspeaker assembly plays sound of different frequencies, the volume of the rear cavity cannot be adjusted according to the corresponding frequency, so it does not have a good sound effect.

SUMMARY

The present disclosure provides a loudspeaker assembly, in which the volume of a second cavity is adjustable, and an electronic device.

The loudspeaker assembly includes a first housing, a second housing, a loudspeaker vibrator and an adjusting mechanism.

The first housing and the loudspeaker vibrator form a first cavity, and the second housing and the loudspeaker vibrator form a second cavity.

The adjusting mechanism includes a driving mechanism and a filling part.

The driving mechanism is able to drive the filling part to extend into or exit from the second cavity, so as to reduce or increase the volume size of the second cavity.

As an example, the driving mechanism includes a driving motor and a transmission assembly. The filling part is a sliding block.

The driving motor is in transmission connection with the sliding block through the transmission assembly.

The second housing has a sliding hole for the sliding block to slide in or out.

The transmission assembly is able to convert a rotation motion of the driving motor into a linear motion, so as to drive the sliding block to slide in or out of the second cavity through the sliding hole.

As an example, the transmission assembly is a screw and nut mechanism.

An output shaft of the driving motor is provided with a thread, and the sliding block is provided with a threaded hole threaded with the output shaft.

The output shaft of the driving motor rotates to drive the sliding block to slide.

As an example, the transmission assembly is a gear and rack mechanism.

The gear of the gear and rack mechanism is sleeved on the output shaft of the driving rotor, the rack of the gear and rack mechanism is connected with the sliding block, and the driving motor drives the gear to rotate, so as to drive the rack and the sliding block to move.

As an example, the sliding block is a rectangular block structure, and the sliding hole is a rectangular hole corresponding to the sliding block.

The sliding block is in sealing contact with the sliding hole.

As an example, the driving mechanism includes an air pump, the filling part is a flexible sealing bag, and the sealing bag has an air hole.

The air pump inflates and deflates the flexible sealing bag through the air hole.

As an example, the second housing is provided with a through hole communicated with the second cavity, and the flexible sealing bag is in sealing contact with the through hole.

An electronic device is also provided, which includes a controller and any above mentioned loudspeaker assembly.

The controller controls a power an/off state of a driving mechanism, so as to control the volume size of a filling part extending into or exiting from a second cavity.

As an example, the electronic device is any one of a smart phone, a tablet computer and a loudspeaker box.

As an example, the electronic device further includes an audio acquisition module.

The audio acquisition module acquires a frequency information of an audio information to be played.

The controller controls the power on/off state of the driving mechanism according to the frequency information.

The beneficial effect of the present disclosure is as follows.

The loudspeaker assembly in the embodiments of the present disclosure changes the volume of the second cavity by adjusting the volume size of the filling part extending into the second cavity, so that the sound performance of the loudspeaker assembly is changed; therefore, on one hand, the sound effect is more diversified; on the other hand, the sound quality is improved.

REFERENCE NUMBERS

1. First housing; 2. Second housing; 3. Loudspeaker vibrator; 4. Driving mechanism; 41. Driving motor; 42. Output shaft; 5. Filling part; 51. Sliding block; 52. Threaded hole; 6. Gear; and 7. Rack.

DETAILED DESCRIPTION OF THE EMBODIMENTS

In order to make those skilled in the art understand the technical solution of the present disclosure better, the embodiments of the present disclosure are elaborated below in combination with the accompanying drawings.

Figure 1:
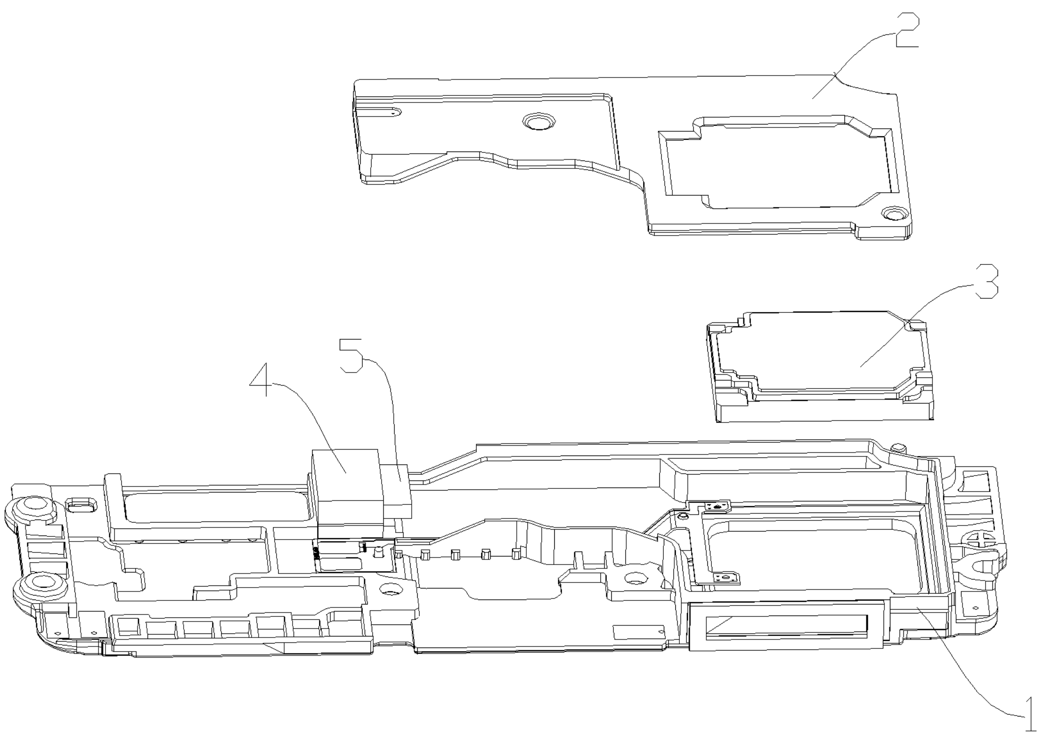
FIG. 1 is an exploded view of a loudspeaker assembly according to an embodiment of the present disclosure.

On one hand, the embodiments of the present disclosure provide a loudspeaker assembly. As shown in FIG. 1, the loudspeaker assembly includes a first housing 1, a second housing 2, a loudspeaker vibrator 3 and an adjusting mechanism. The first housing 1 (part of it) and the loudspeaker vibrator 3 form a first cavity, and the second housing 2 (part of it) and the loudspeaker vibrator 3 form a second cavity. The adjusting mechanism includes a driving mechanism 4 and a filling part 5. The driving mechanism 4 drives the filling part 5 to move, so as to change the volume of the filling part 5 extending into the second cavity, and thus reduce and increase the volume size of the second cavity.

The sound quality of the loudspeaker assembly is not only related to the performance of the loudspeaker vibrator 3, but also has a close relationship with the volume size of a front cavity and the volume size of a rear cavity. In the embodiments provided by the present disclosure, the first cavity is the front cavity of the loudspeaker assembly, and the second cavity is the rear cavity of the loudspeaker assembly. The loudspeaker assembly is equipped with the adjusting mechanism to make the volume size of the second cavity (rear cavity) adjustable. The available volume of the second cavity is changed by changing the volume, occupied by the filling part 5, of the second cavity through driving mechanism 4, and then the sound performance of the loudspeaker assembly is changed, which makes its sound effect more diversified, and also improves its sound quality.

Figure 2:
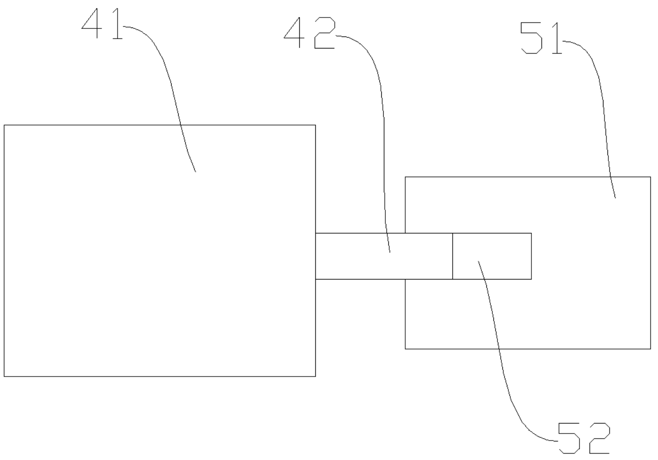
FIG. 2 is a structure diagram of a transmission assembly according to the first embodiment of the loudspeaker assembly in the present disclosure.
Figure 3:
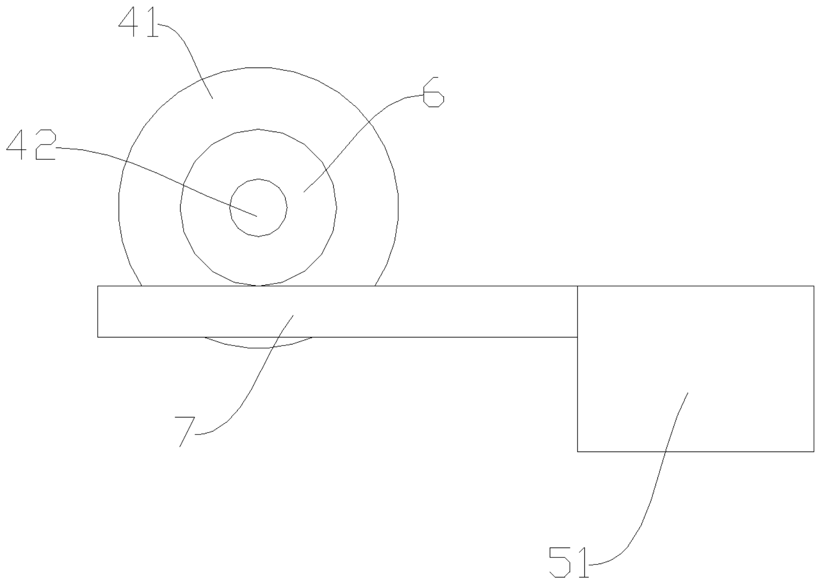
FIG. 3 is a structure diagram of a transmission assembly according to the second embodiment of the loudspeaker assembly in the present disclosure.

Further, as shown in FIG. 1 to FIG. 3, in the embodiments provided by the present disclosure, the driving mechanism 4 includes a driving motor 41 and a transmission assembly. The filling part 5 is a sliding block 51. The driving motor 41 is in transmission connection with the sliding block 51 through the transmission assembly. The second housing 2 has a sliding hole (not shown in the figures) that limits reciprocating sliding of the sliding block 51. The transmission assembly converts a rotation motion of the driving motor 41 into a linear motion, so as to drive the sliding block 51 to slide in a straight line.

Specifically, as shown in FIG. 2, in the first embodiment, the transmission assembly is a screw and a nut mechanism. An output shaft 42 of the driving motor 41 is provided with a thread (not shown in the figures), and the sliding block 51 is provided with a threaded hole 52 threaded with the output shaft 42. The output shaft 42 of the driving motor 41 rotates to drive the sliding block 51 to slide. The sliding block 51 is a rectangular block, and the sliding hole (not shown in the figures) is a rectangular hole corresponding to the sliding block 51, and the sliding block 51 is in sealing contact with the sliding hole. Such a structure can not only ensure that the sliding block 51 partially slides in and out of the second cavity along the slide hole when the driving motor 41 rotates, but also ensure the sealing property of the second cavity. In order to further improve the sealing property of the second cavity, the threaded hole 52 on the sliding block 51 is a blind hole.

Certainly, in other embodiments, the sliding block 51 is also in other shapes. For example, the cross-section shape of the sliding block 51 is also polygonal structures such as triangle and hexagon. Correspondingly, the cross-section shape of the sliding hole should be triangular structure, hexagonal structure and other structures corresponding to the cross-section shape of the sliding block 51, which is not specified in the embodiments.

Further, as shown in FIG. 3, in the second embodiment, the transmission assembly is also a gear and a rack mechanism. The gear 6 is sleeved on the output shaft 42 of the driving rotor 41, the rack 7 is connected with the sliding block 51, and the driving motor 41 drives the gear 6 to rotate, so as to drive the rack 7 and the sliding block 51 to move. The sliding block 51 is a rectangular block, and the sliding hole is a rectangular hole corresponding to the sliding block 51. The sliding block 51 is in sealing contact with the sliding hole to ensure the sealing property of the second cavity. A rack-shaped structure is also provided on the main body of the sliding block 51 to engage with the gear 6; however, in order to reduce the production cost and ensure the sealing property of the second cavity, in the embodiments, the sliding block 51 is fixedly connected with the formed rack 7, so as to drive the sliding block 51 to slide through the engagement between the rack 7 and the gear 6.

Certainly, in other embodiments, the sliding block 51 is also in other shapes. For example, the cross-section shape of the sliding block 51 is also structures such as circle, triangle and hexagon. Correspondingly, the cross-section shape of the sliding hole should be circle, triangle, hexagon and other structures corresponding to the cross-section shape of the sliding block 51, which is not specified in the embodiments.

The first housing 1 and the second housing 2 is made of plastic (for example, polyethylene and PVC), and the sliding block 51 is also made of plastic. Certainly, in order to improve the response speed of the sliding block 51, a lightweight material is used to make the sliding block 51.

In addition, in other embodiments (not shown in the figures) of the loudspeaker assembly provided by the present disclosure, the driving mechanism 4 includes an air pump, the filling part 5 is a flexible sealing bag, and the sealing bag has an air hole. The air pump inflates and deflates the flexible sealing bag through the air hole. The second housing 2 is provided with a through hole communicated with the second cavity, and the flexible sealing bag is in sealing contact with the through hole.

The sealing bag is provided inside the second cavity. The air hole of the sealing bag is connected with the through hole of the second cavity, and the air hole is connected with the through hole. The air pump is disposed out of the second cavity and connected with the through hole of the second cavity, so it inflates and deflates the flexible sealing bag through the air hole. Further, the sealing bag is a rubber bag, a plastic bag, a latex bag, etc. Those skilled in the art chooses the material of the sealing bag according to actual needs, which is not specified in the embodiments.

On the other hand, the embodiments of the present disclosure also provides an electronic device (e.g. a smart phone, a tablet computer, and a loudspeaker box), which includes a controller and any above mentioned loudspeaker assembly. The controller controls a power on/off state of the driving mechanism 4, so as to control the volume size of the filling part 5 extending into or exiting from the second cavity.

Specifically, taking a smart phone as an example, when a user plays music, the music playing effect is personalized, for example, the playing effect is: bass enhancement or treble enhancement; when the user needs to play music with bass enhancement effect, the controller controls the driving mechanism 4 according to a corresponding operation of the user, so as to make the filling part 5 (part of it) exit from the second cavity, thus increasing the volume size of the second cavity and keeping the state. The volume size of the filling part 5 exiting from the second cavity is determined according to the intensity of bass enhancement required by the user; when the user needs to play music with treble enhancement effect, the controller controls the driving mechanism 4 according to the corresponding operation of the user, so as to make the filling part 5 (part of it) extend into the second cavity, thus reducing the volume size of the second cavity and keeping the state.

To further improve the sound quality, in the embodiments, the electronic device further includes an audio acquisition module. The audio acquisition module acquires a frequency information of an audio information to be played, and the controller controls the power on/off state of the driving mechanism 4 according to the frequency information.

Specifically, taking a smart phone as an example, when the user plays a piece of music, the audio acquisition module acquires the frequency information in the audio information of the music, the controller controls the power on/off state of the driving mechanism 4 according to the frequency information, and then controls the volume size of the second cavity. During the music playing process, the volume of the second cavity is controlled to increase at a certain time point, and the volume of the second cavity is controlled to decrease at the next time point. Those skilled in the art adjusts the specific control logic and the realized playing effect accordingly, which is not specified in the embodiments.

It is apparent that those skilled in the art makes various modifications and variations to the disclosure without departing from the spirit and scope of the disclosure. Thus, if such modifications and variations of the disclosure fall within the scope of the appended claims and their equivalents, the disclosure is also intended to cover the modifications and variations.

What is claimed is:

1. A loudspeaker assembly, comprising: a first housing, a second housing, a loudspeaker vibrator and an adjusting mechanism;

the first housing and the loudspeaker vibrator form a first cavity, and the second housing and the loudspeaker vibrator form a second cavity;

the adjusting mechanism comprises a driving mechanism and a filling part; and the driving mechanism is able to drive the filling part to move, so as to change a volume of the filling part extending into the second cavity;

the driving mechanism comprises a driving motor and a transmission assembly, and the filling part is a sliding block;

the driving motor is in transmission connection with the sliding block through the transmission assembly;

the second housing is provided with a sliding hole that limits reciprocating sliding of the sliding block;

wherein the transmission assembly is able to convert a rotation motion of the driving motor into a linear motion, so as to drive the sliding block to slide in a straight line;

the transmission assembly is a gear and rack mechanism;

a gear of the gear and rack mechanism is sleeved on the output shaft of the driving motor, a rack of the gear and rack mechanism is connected with the sliding block, and the driving motor drives the gear to rotate, so as to drive the rack and the sliding block to move.

2. The loudspeaker assembly as claimed in claim 1, wherein the sliding block is a rectangular block structure, and the sliding hole is a rectangular hole corresponding to the sliding block;

wherein the sliding block is in sealing contact with the sliding hole.

3. An electronic device, comprising a controller, and further comprising the loudspeaker assembly as claimed in claim 1, wherein the controller is able to control a power on/off state of a driving mechanism, so as to control a volume size of a filling part extending into or exiting from a second cavity.

4. The electronic device as claimed in claim 3, wherein the electronic device is any one of a smart phone, a tablet computer and a loudspeaker box.

5. The electronic device as claimed in claim 3, further comprising an audio acquisition module;

the audio acquisition module is able to acquire a frequency information of an audio information to be played; and the controller is able to control the power on/off state of the driving mechanism according to the frequency information.

6. The electronic device as claimed in claim 3, wherein the sliding block is a rectangular block structure, and the sliding hole is a rectangular hole corresponding to the sliding block;

wherein the sliding block is in sealing contact with the sliding hole.

7. A loudspeaker assembly comprising: a first housing, a second housing, a loudspeaker vibrator and an adjusting mechanism;

the first housing and the loudspeaker vibrator form a first cavity, and the second housing and the loudspeaker vibrator form a second cavity;

the adjusting mechanism comprises a driving mechanism and a filling part; and the driving mechanism is able to drive the filling part to move, so as to change a volume of the filling part extending into the second cavity;

wherein the driving mechanism comprises an air pump, the filling part is a flexible sealing bag, and the sealing bag is provided with an air hole;

the air pump is able to inflate and deflate the flexible sealing bag through the air hole.

8. The loudspeaker assembly as claimed in claim 7, wherein the second housing is provided with a through hole communicated with the second cavity, and the flexible sealing bag is in sealing contact with the through hole.

9. An electronic device comprising a controller, and further comprising the loudspeaker assembly as claimed in claim 7, wherein the controller is able to control a power on/off state of a driving mechanism, so as to control a volume size of a filling part extending into or exiting from a second cavity.

10. The electronic device as claimed in claim 9, wherein the second housing is provided with a through hole communicated with the second cavity, and the flexible sealing bag is in sealing contact with the through hole.

* * * * *